Aug. 11, 1970  C. H. ANDERSON ET AL  3,523,615
CABLE HOISTING AND HAULING APPARATUS
Filed Jan. 17, 1968  4 Sheets-Sheet 2
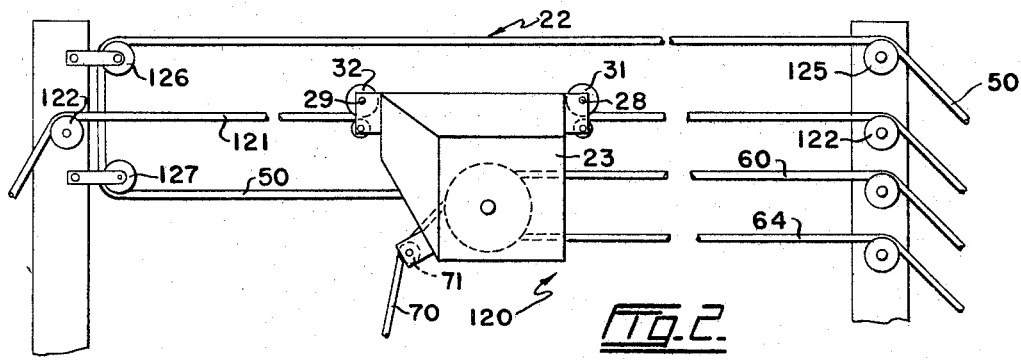
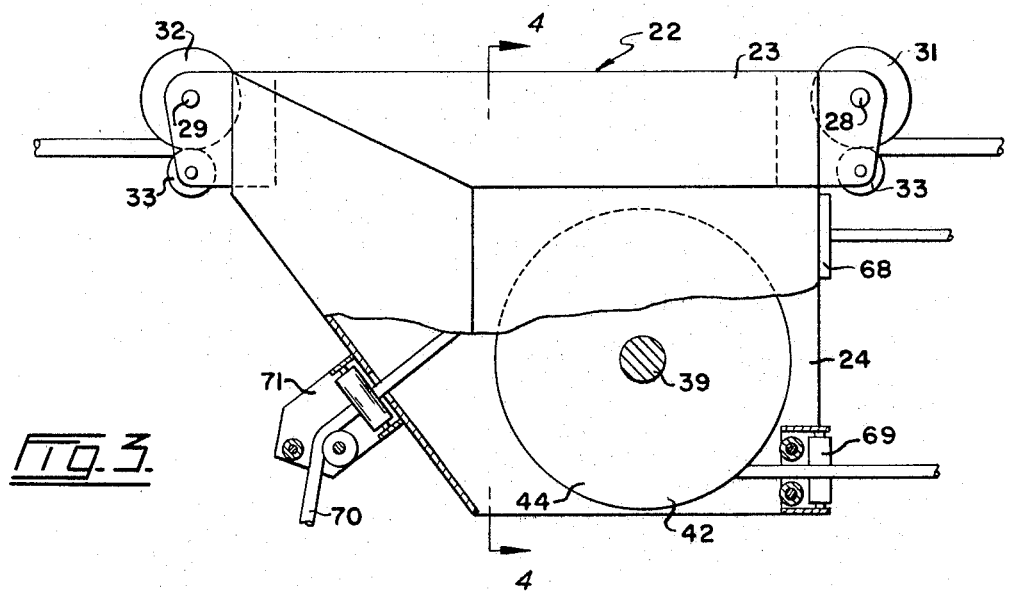
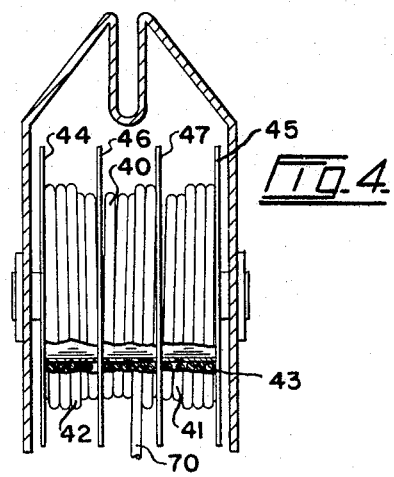
INVENTORS
CLAY H. ANDERSON
JAMES M. EWART
BY
ATTORNEYS Aug. 11, 1970          C. H. ANDERSON ET AL          3,523,615
                CABLE HOISTING AND HAULING APPARATUS
Filed Jan. 17, 1968                              4 Sheets-Sheet 3

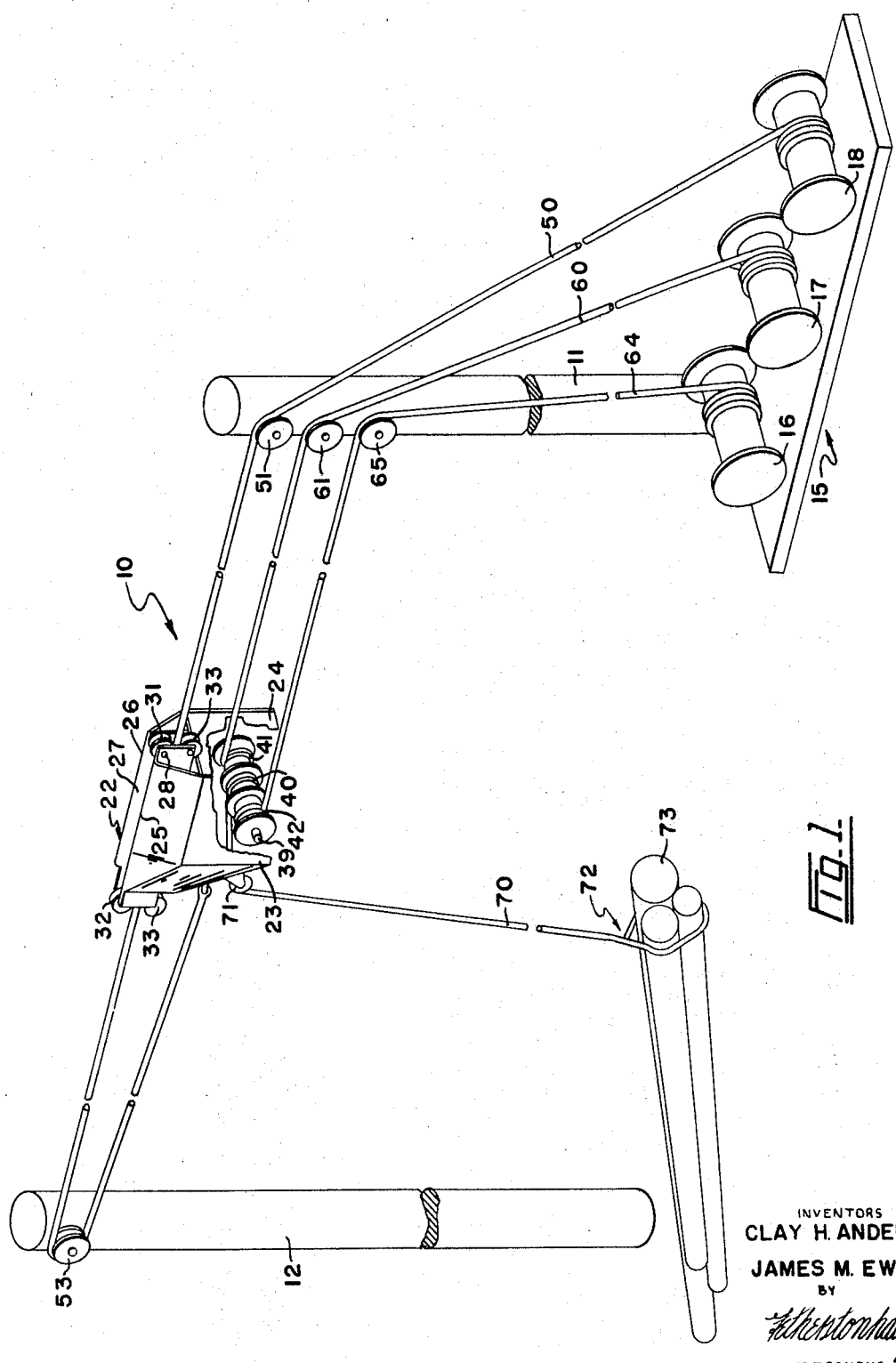

INVENTORS
CLAY H. ANDERSON
JAMES M. EWART
BY
Fetherstonhaugh & Co.
ATTORNEYS

Aug. 11, 1970 C. H. ANDERSON ET AL 3,523,615
CABLE HOISTING AND HAULING APPARATUS
Filed Jan. 17, 1968 4 Sheets-Sheet 4
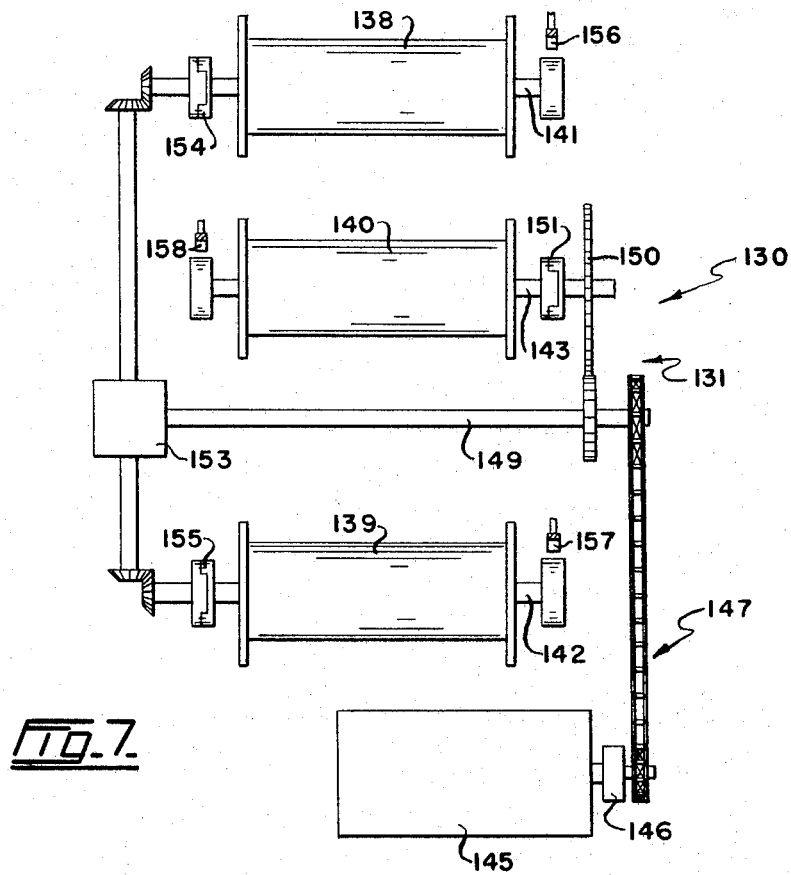
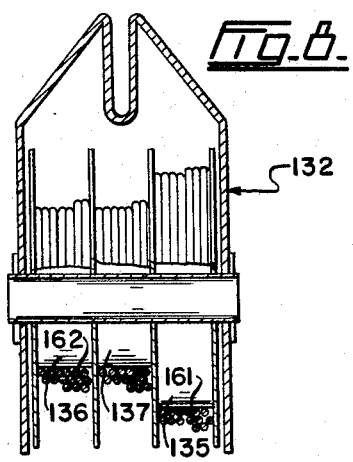
INVENTORS
CLAY H. ANDERSON
JAMES M. EWART
BY
Fetherstonhaugh & Co.
ATTORNEYS

United States Patent Office 3,523,615
Patented Aug. 11, 1970

3,523,615
CABLE HOISTING AND HAULING APPARATUS
Clay H. Anderson, Wellington, British Columbia, and James M. Ewart, Nanaimo, British Columbia, Canada, assignors to S. Madill Ltd., Nanaimo, British Columbia, Canada
Filed Jan. 17, 1968, Ser. No. 698,627
Int. Cl. B66c 21/00
U.S. Cl. 212—96                                                                            4 Claims

ABSTRACT OF THE DISCLOSURE

Cable hoisting and hauling apparatus having a travelling carriage provided with a winding spool and tong line wound thereon. A pair of haul-in cables each wound over a stationary winding drum the latter being powered through a torque converter and being operatively connected to the winding spool on the carriage in a manner which will result in the application of a differential torque on the winding spool carrying the tong line and at the same time, cause the carriage to move. The carriage speed and consequently the output speed of the torque converter and the differential torque applied to the winding spool over which the tong line is wound is controlled by applying drag to the carriage through a back-haul line connected thereto.

BACKGROUND OF THE INVENTION

This invention relates to cable hoisting and hauling apparatus and in particular, to hauling apparatus employed in the lumbering industry for skidding logs from their cutting site to a loading site.

The high cost of operation and the depreciation of easily accessible lumber sources in the lumbering industry has, necessitated the redesign and development of new cable hoisting and hauling systems which are so arranged as to permit the skidding of logs at high speeds from extended locations yet which may be operated by the employment of a limited number of personnel.

Most hoisting and hauling systems of prior design have employed head and tail spars between which a line is run for supporting a travelling carriage. Haul-in lines and back haul lines operated from a central winch are employed to move the carriage back and forth over the supporting cable. The logs are usually supported by a tong line, itself supported by the carriage and operated by the operator at the winch. The tong line is usually fastened to one end of the logs and the operator attempts to carry out the skidding operation by lifting only one end of the logs from the ground and permitting their other ends to drag as the carriage is moved over the cable thereby imposing minimum stresses on the tong line and the entire apparatus.

In order to maintain a constant tension on the tong line as the logs are skidded over a normally undulating ground surface, the length of the tong line between the carriage and the logs must constantly be changed and operators of equipment of prior design have found this virtually impossible to do when attempting to carry out a skidding operation at a high speed. This therefore results in sudden, heavy strains being imposed upon the entire system. Consequently as the hoisting and hauling apparatus must be so constructed as to withstand these heavy stresses and strains, the cables supporting the carriage, the haul-in and tong cables, the spars and spar supports must all be of great strength. The weight of the apparatus is therefore excessive thereby resulting in both excessive setting up and operational costs.

SUMMARY OF THE INVENTION

The cable hoisting and hauling apparatus of the present invention as in most other apparatus of this nature employs a carriage cable, haul-in lines, a back haul line and a tong line, however, it is so designed that the tension in the tong line, as the carriage moves over its supporting cable, may be controlled solely, by imposing a drag on the carriage by means of applying a braking force to the haul back line. The present apparatus is so designed that the winch operator need only vary the amount of braking force applied to the drum over which his back haul line is wound to vary the tension in the tong line. It is only necessary for the winch operator, once the desired tension has been applied to the tong line by control of the tension of the haul back line, to maintain the back haul line tension constant. This is a very simple matter with the use of brakes of modern design such as water cooled brakes and permits the winch operator to maintain constant tension in the tong line regardless of the carriage speed.

As the present apparatus is not subject to excessive strains, the size and weight of the entire apparatus may be greatly reduced, not only permitting a fast setting up operation with less men but permitting the apparatus to be extended over greater distances than is possible with apparatus of prior design.

Furthermore, as the winch operator is not required to continually adjust the tension in the tong line operational speeds are limited only by the power of the winch.

The cable hoisting and hauling apparatus of the present invention comprises a carriage, supporting means for supporting the carriage for reciprocal movement over and in spaced relation to the ground surface, a winding spool on the carriage, rotatable means on the carriage operably connected to the winding spool, a tong line wound on the winding spool, a pair of stationary independently rotatable winding drums, constant speed drive means including torque conversion means drivingly connectable to each stationary winding drum, said torque conversion means having an inverse output speed to torque output relationship, a pair of haul-in cables extending from the stationary winding drum and operatively connected in counter acting relationship to the rotatable means, said rotatable means and said drive means being arranged to result in a torque differential applied to the winding spool on the carriage, thereby resulting in simultaneous reeling in of the tong line against the weight of a load connected thereto and movement of the carriage in one direction over the supporting means and adjustable drive means for adjustably controlling the speed of movement of the carriage thereby permitting control of the torque output of the torque conversion means and the torque differential applied to the winding spool on the carriage.

BRIEF DESCRIPTION OF THE DRAWINGS

FIG. 1 is a diagrammatic representation of one embodiment of the invention, portions of the carriage being removed for illustrated purposes, FIG. 2 is a diagrammatic representation of a portion of another embodiment of the invention, FIG. 3 is an enlarged side view of the carriage, portions thereof being removed for illustrative purposes, FIG. 4 is a sectional view taken along line 4—4 of FIG. 3, FIG. 7 is a diagrammatic representation of another type of winch employed with slightly modified forms of either embodiment of the invention, and FIG. 8 is an end view, partially in section, of a carriage employed with the winch illustrated in FIG. 7.

DESCRIPTION OF THE PREFERRED EMBODIMENTS

Figure 5:
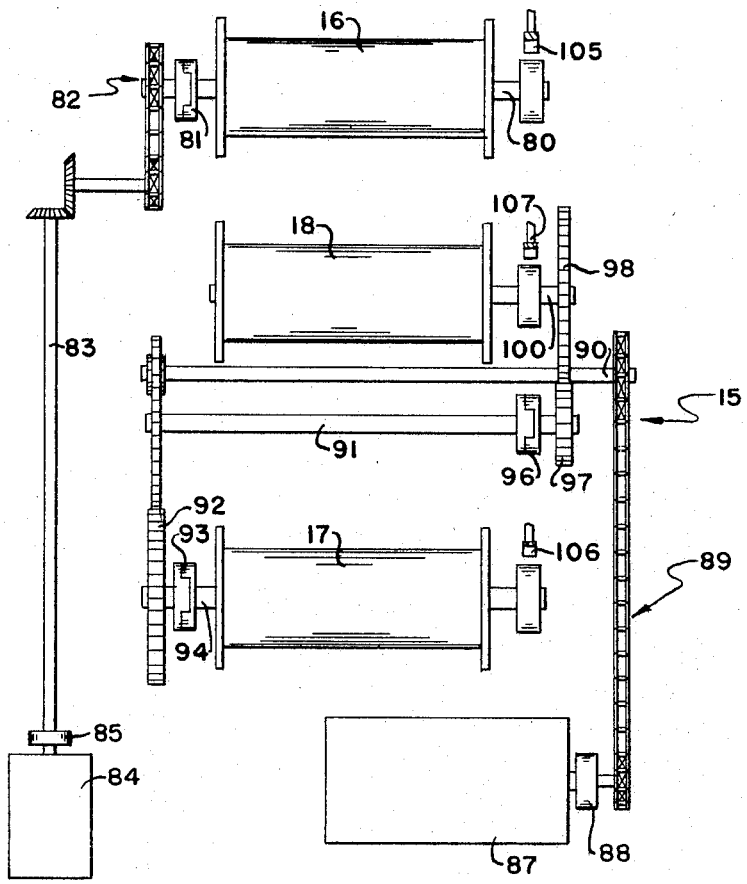
FIG. 5 is a diagrammatic representation of a winch employed with either of the embodiments of the invention.

Referring to the drawings and in particular, to FIGS. 1, 3 and 4, there is illustrated one embodiment 10 of a cable hoisting and hauling apparatus. Apparatus 10, as is common with all cable hoisting and hauling apparatus, employs a head spar 11 which is located at or near the point at which the logs are to be loaded for transportation to the mill and the like and a tail spar 12 which is located adjacent the cutting site. The tail spar 12 is usually a tree, topped to size and supported by suitable guy wires. The head spar 11 may also be a tree of suitable size or a portable spar. Near the head spar a stationary winch 15 is located, said winch having at least three winding drums 16, 17 and 18 which may be operably controlled, in a matter hereinafter to be described, by a single operator.

Apparatus 10 also includes a carriage 22. This carriage is formed of a pair of spaced apart side plates 23 and 24 welded along their upper edges 25 and 26 respectively to an elongated U-shaped trough 27. Mounted on shafts 28 and 29 extending transversely through the trough 27 at either end thereof are supporting sheaves 31 and 32 respectfully and below each of these sheaves are guide sheaves 33.

A drum supporting shaft 39 is secured in a standard manner between the side plates 23 and 24. Rotatably mounted on the shaft 39 is a central winding spool 40 sandwiched between, and interconnected for mutual rotation with, a pair of winding drums 41 and 42. In FIG. 4 is shown, a preferred form of construction of the winding drums 41 and 42 and winding spool 40. These drums 41 and 42 and spool are formed on a central, common, elongated hollow core 43 the latter having annular flanges 44 and 45 welded at either end. These flanges are each rotatably journalled on the shaft 39. Also welded to the core and spaced apart equidistant from each other and from the flanges 44 and 45 are a pair of central annular flanges 46 and 47, dividing the core into three sections.

A haul back cable 50 is wound over drum 18 of the winch 15 and extends over a sheave 51 on the head spar 11 thence between supporting sheaves 31 and 32 and their associated guide sheaves 33, thence over a sheave 53 on tail spar 12, thence back to the carriage to which it is connected as by a book or shackle 54.

A first haul-in cable 60 is wound on drum 17, passes over a sheave 61 and is wound on winding drum 41. A second haul-in cable 64 is wound on drum 16, passes over a sheave 65 on head spar 11 and is wound on drum 42 opposite to the direction in which cable 60 is wound on drum 41. Both cables 60 and 64 are guided onto their respective winding drums 41 and 42 by means of conventional fair leads 68 and 69 respectively, mounted on the carriage 22.

A tong line 70 is wound on winding spool 40 in a direction opposite to the direction in which cable 60 is wound on drum 41 and extends through a fair lead 71 mounted on the carriage and depends freely downwardly therefrom. This tong line is provided with suitable means 72 for grasping logs 73 for lifting and hauling the latter.

The drive arrangement of the winch 15 is illustrated in FIG. 5. The back haul drum 16 is non-rotatably mounted on a rotatable supporting shaft 80 which is selectively connectable through a clutch 81 and drive linkage 82 to a drive shaft 83. This drive shaft 83 is driven by a constant speed diesel or gasoline motor 84 through a hydraulic torque converter 85. The back haul drum 18 and haul in drum 17 are both drivingly and selectably connectable to a constant speed gasoline or diesel motor 87 which has a greater output than motor 84. This motor 87 is drivingly connected through a hydraulic torque converter 88 and chain and sprocket assembly 89 to a drive shaft 90, the latter being in direct gear driven relationship with a rotatable jack shaft 91. The jack shaft 91 has a gear driving relationship with a gear 92, said gear 92 being selectively engageable through a clutch 93 with a rotatable supporting shaft 94 on which the drum 17 is non-rotatably mounted. The jack shaft 91 is also selectively engageable through a clutch 96 with a gear 97, the latter driving a gear 98, the latter being drivingly connected to a rotatable supporting shaft 100 on which drum 18 is non-rotatably mounted. Shafts 80, 94 and 100 are equipped with brakes 105, 106 and 107 respectively. These brakes are preferably of the water cooled type. The clutches, brakes and controls for both motors 84 and 87 are arranged so that they all may be operated from a single source by one operator.

Figure 6:
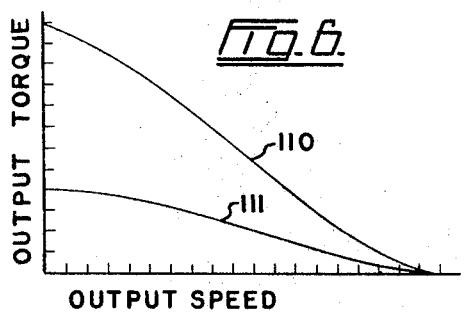
FIG. 6 illustrates typical curves of hydraulic torque converters, the output torque being plotted against the output speed.

The provision of the torque converters 85 and 88 not only permits smooth transfer of power from their respective motors 84 and 87, but as is characteristic with all hydraulic torque converters provide output torque which varies inversely with output speed. Referring to FIG. 6 in which the output torque against output speed curves of both converters 85 and 88 are plotted, the curve of converter 88 being accorded the numeral 110 and the curve of converter 85 being accorded the numeral 111, it will be seen that the difference in output torque of the converters, throughout substantially the entire operating range of the latter are directly proportionate to the power output of their respective motors. It will be appreciated therefore that at constant motor operating speeds, the torque differential of the converters may be increased or decreased in proportion to the power output of their respective motors by appropriate decreases or increases in the output speeds of both torque converters as effected by corresponding decrease or increase of the rotational speed of the drums 16 and 17.

In the mechanical arrangement of the winch 15 as illustrated in FIG. 5, the drums 16 and 17 are of substantially the same diameter and the mechanical linkage of each of said drums 16 and 17 to their respective motors 84 and 87 is such that with the last mentioned drums rotating at the same speed, the torque transmitted to each and consequently, the tension transmitted to their respective haul in cables 60 and 64 will always be proportionate to the horsepowers of their respective motors 84 and 87 and as the cores of both winding drums 41 and 42 are of the same diameter and have their respective cables wound in opposite directions thereon, the difference in line tension will be transmitted as a differential torque to winding spool 40 thereby tending to wind in the tong line 70.

In the operation of apparatus 10, the tong line 70 is connected to a pile of logs 73 near one end of the pile and the back haul drum 18 is then disengaged, through the operation of the clutch 96, from motor 87 and the brake 107 partially applied. With motors 84 and 87 set at a constant operating speed the clutches 93 and 81 are then operated to engage haul-in drums 16 and 17 with their respective motors 84 and 87. The torque differential applied to the winding spool as aforesaid, results in a winding of the tong line on winding spool 40 and simultaneous movement of the carriage towards the head spar 11 thereby resulting in a tightening of the haul back line 50 and elevation of the carriage. The speed of the carriage and consequent output speed of the torque converters 84 and 87 is adjusted by appropriate adjustments of the brake 107 until the torque differential on winding spool 40 and consequent tension on tong line 70 is such that the end of the pile of logs to which the tong line is connected is just lifted clear of the ground.

When the logs have been lifted to the height desired by the operator, the brake 107 requires no further adjustment. The speed of the carriage and the difference in tension between haul-in cables 60 and 64 will remain constant thereby maintaining a constant torque differential applied to winding spool 40 and a constant tension in tong line 70. Any increases or decreases necessary in the length of the tong line due to undulations of the ground surface to maintain the pile of logs in position where one end is lifted off the ground while the other end of the pile drags is obtained by differential movement of haul-in cables 60 and 64 and consequent paying out or reeling in of the tong line.

In order to return the carriage from the head spar to the tail spar, it is only necessary to disengage drums 16 and 17 from their respective motors, engage the back haul drum 18 with motor 87 and at the same time, apply tension to haul in line 60 by application of brake 106. The tong line will be reeled in to bring a stop 10 fastened thereon against the fair lead 71 through which it runs thus balancing the tension in line 60 and back haul line 50 so as to elevate the carriage as the back haul line is being reeled in on its associated winding drum.

In the design of cable hoisting and hauling apparatus, the maximum stress or strain applied to the tongue line is the determining feature in the design. In systems of prior art the components thereof have, of necessity, been designed to withstand sudden stresses which, by way of example, have resulted by way of the tong line supporting the full weight of the pile of logs. Such systems have therefore required cables of large diameter, the excessive use of guy wires for the spars and oversized winch operating components.

On the other hand, the present invention, as exemplified by apparatus 10, need only be designed to withstand relatively low predetermined stresses on the tong line. This permits a reduction in the weight of the various components of the system and thereby permits its setting up and operation by fewer personnel. Furthermore, operational speed of the carriage may be high as once the brake controlling the operation of the back haul line is correctly set, further adjustment is unnecessary.

FIG. 2 illustrates diagrammatically a portion of another embodiment 120 of the apparatus. As both apparatus 100 and 120 are identical in most respects, the same numerals would be used to identify similar components. Carriage 22 of apparatus 120 is suspended on a high line 121 rather than on the back haul cable 50 as in apparatus 10. This high line is carried over sheaves 122 mounted on head and tail spars 11 and 12 respectively and anchored in the suitable fashion at either end. The back haul line 50 extends over a sheave 125 mounted on head spar 11 thence over sheaves 126 and 127 mounted on tail spar 12 and then connected to carriage 15 in the same manner as described with respect to apparatus 10.

The back haul cable 50 and first and second haul-in cables 60 and 64 are operated from the winch 15 not shown, in the same manner as their counterparts of apparatus 10.

Apparatus 120 is operated in exactly the same manner as apparatus 10 when engaged in skidding logs, however, its carriage 15 is always supported above the ground surface by the high line 121 thereby making it unnecessary to maintain tension on haul in cable 60 when returning the carriage for another load. Furthermore, as the weight of the carriage and logs are supported on the high line, the tension in the tong line of apparatus 120 will be much less than the tension in the tong line of apparatus 10.

FIGS. 7 and 8 illustrate, in part, another embodiment 130 of the invention. Apparatus 130 employs a winch 131 which is substantially different to winch 15 and employs a carriage 132 which is identical to carriage 22 with the exception of the construction and size difference of winding drums 135 and 136 and winding spool 137. The winch 131 and carriage 132 may be used to replace their counter part in apparatus 10 and apparatus 120. Consequently, only the winch 131 and carriage 132 is illustrated and described.

Winch 131 includes haul-in drum 138, haul-in drum 139 and a back haul drum 140, said drums being non-rotatably mounted on rotatable supporting shafts 141, 142 and 143 respectively. A gasoline or diesel motor 145 is drivingly connected through a torque converter 146 and chain and sprocket assembly 147 to a jack shaft 149. The jack shaft 149 is in driving engagement with the shaft 143 through gears 150 and clutch 151. The jack shaft 149 is also in driving engagement through a differential 153 and clutches 154 and 155, with the supporting shafts 141 and 142 respectively. Both drums 138 and 139 are of substantially identical core size and the driving engagement of each with the jack shaft 149 is such that the torque applied to each of them through the torque converter 146 is identical. As in winch 15 the shafts 141, 142 and 143 are provided with adjustable brakes 156, 157 and 158 respectively.

Winding drums 135 and 136 and winding pool 137 are constructed in the same manner as are winding drums 41 and 42 and winding spool 40 with the exception that winding drum 135 has a core 161 larger than the core 162 of winding drum 136 in the ratio preferably of 1.3 to 1.

In the use of the winch 131 and carriage 132 as a replacement for their counterparts 15 and 22, the cable 60 is wound over winding drum 135 and cable 64 wound over winding drum 136. The operational characteristics and the method of operating apparatus 130 are exactly the same as those involved in winch 15 and carriage 22 in apparatus 110 and 120. As the drums 138 and 139 are of the same diameter and as the torque applied to each is the same, the tensions in line 64 and 60 will also be identical. However, as winding drum 135 is larger in diameter than winding drum 136 a differential torque will be applied to the winding pool 137 thereby permitting the application of tension to the tong line.

As has been described with reference to apparatus 110 and 120, this tension on the tong line may be altered by altering the speed of the carriage by appropriate application of the brake 158 controlling the tension in the back haul line 50.

Obviously changes may be made in the forms, dimensions and mechanical arrangements of the parts of the invention without departing from the principle thereof. For instance, the winding spools of either carriage may be in gear or chain driven relationship with their respective carriage-supported winding drums.

We claim:
1. Cable hoisting and hauling apparatus including:
   a cable supported carriage,
   a winding spool on the carriage,
   a tong cable wound on the winding spool,
   first and second aerial winding drums on the carriage connected to the winding spool for rotation therewith,
   a first haul in cable wound on the first aerial winding drum,
   a second haul in cable wound on the second aerial winding drum,
      said cables being arranged so that the tong line and second haul in cable are wound in when the first haul in cable is wound out,
   first and second stationary winding drums on which the first and second cables, respectively are wound,
   first and second hydraulic torque converters drivingly connected to the first and second stationary winding drums, respectively,
   power drive means drivingly connected to each torque converter,
      said powered drive means includes a pair of constant speed motors having disproportionate power output, the motor having the greater output being drivingly connected to the first torque converter so that the power output of the first torque converter is greater than the power output of the second torque converter as to result in a torque differential transferred to said wind- ing spool tending to rotate the latter to wind in the tong line as the carriage moves under the pull of both cables, and brake means adjustably governing the speed of the carriage so as to adjustably govern the said torque differential and consequent tension in the tong line.

2. Structure as defined in claim 1 in which the brake means includes a haul back line connected to the carriage and wound over a third stationary winding drum said third winding drum having manually operable brakes for controlling the speed of the carriage.

3. Structure as defined in claim 1 wherein the first and second winding drums and winding spools include a common core having four annular flanges secured thereto in axially spaced apart relationship so as to divide the core into three flanged sections.

4. Structure as defined in claim 1 in which the power drive means includes a single motor and a differential gear arrangement connecting said motor to the torque converters, the diameters of said first and second winding drums being disproportionate so as to provide a torque differential to the winding spool.

References Cited
UNITED STATES PATENTS 878,982  6/1906  Miller _____ 212—96

HARVEY C. HORNSBY, Primary Examiner

U.S. Cl. X.R.

212—98; 254—185